(No Model.)
C. E. CANDEE.
CAR AXLE.
No. 366,618. Patented July 12, 1887.
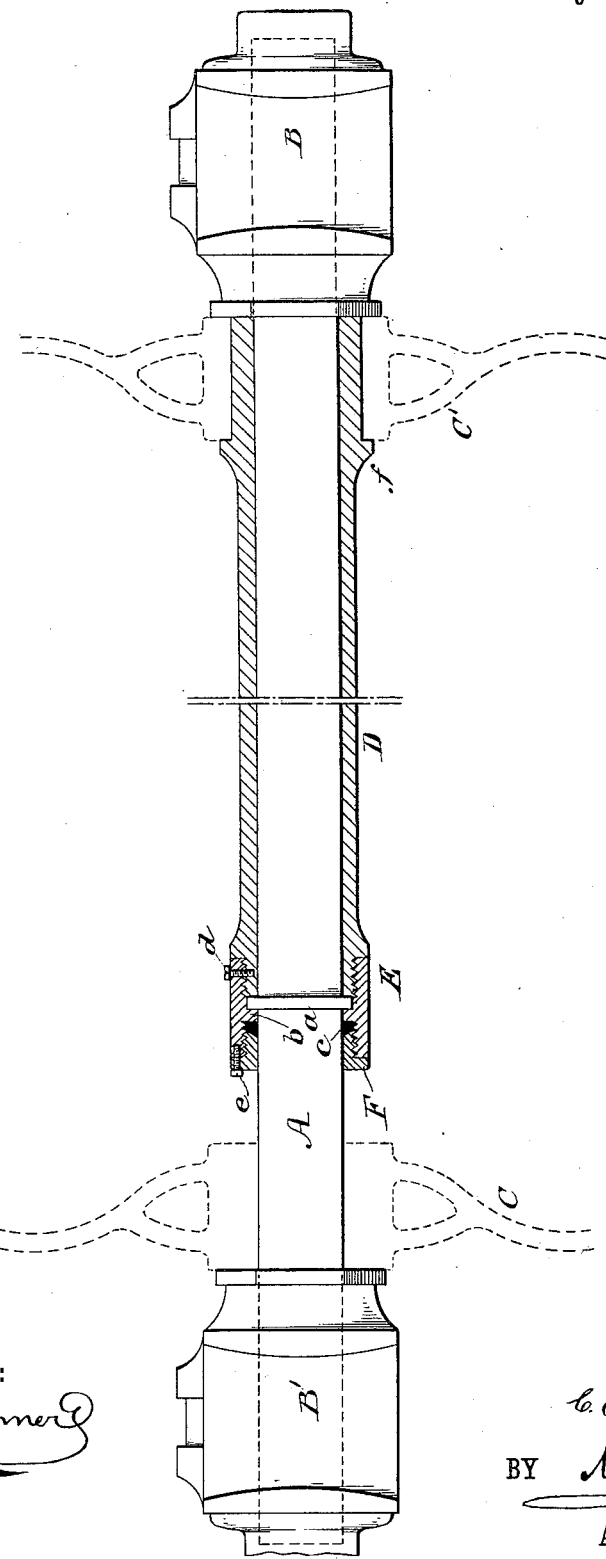
WITNESSES:
INVENTOR:
C. E. Candee
BY
ATTORNEYS.

UNITED STATES PATENT OFFICE.

CHARLES E. CANDEE, OF NEW YORK, ASSIGNOR TO HIMSELF AND ALBERT G. STORY, OF LITTLE FALLS, NEW YORK.

CAR-AXLE.

SPECIFICATION forming part of Letters Patent No. 366,618, dated July 12, 1887.

Application filed April 16, 1886. Serial No. 199,079. (No model.)

*To all whom it may concern:*

Be it known that I, CHARLES E. CANDEE, of the city, county, and State of New York, have invented a new and useful Improvement in Car-Axles, of which the following is a specification, reference being had to the annexed drawing, which is a side elevation of my improved car-axle.

The object of my invention is to furnish a car-axle which will permit the car-wheels to turn independently of each other, while the strength of the axle is increased rather than diminished.

My invention consists in a car-axle having a collar formed on or attached to it between the middle and the end of the axle, and in a sleeve fitted to the axle and provided with an internally-flanged collar, which, together with the end of the sleeve, incloses the collar of the axle and prevents end motion between the sleeve and the axle, one car-wheel being secured to the sleeve and the other to the axle.

My invention also consists in a gland connected with the end of the sleeve for preventing the entrance of dust, and for retaining the lubricator in the sleeve.

The axle A turns in journal-boxes B B' in the usual way, and upon the axle near the journal-box B' is secured one of the car-wheels, C, (as indicated in dotted lines,) and near the wheel C, upon the axle A, there is a collar, *a*, which is formed integrally with the axle, or attached thereto, and between the collar *a* and the journal-box B a sleeve, D, is received upon the axle, the axle being turned and the sleeve bored to adapt one to turn within the other. The end of the sleeve D adjoining the collar *a* of the axle is threaded and receives a sleeve, E, which is provided with an internal flange or fillet, *b*, between which and the end of the sleeve B the collar *a* is inclosed. The outer end of the sleeve E is internally threaded to receive a gland, F, which confines the packing *c* around the axle and prevents the escape of oil from the sleeve D. The sleeve E is provided with a set-screw, *d*, the end of which enters the sleeve D and prevents the sleeve E from unscrewing. In a similar way the gland F is provided with a set-screw, *e*, the end of which enters the end of the sleeve E and prevents the gland from becoming accidentally loosened.

Near the end of the sleeve D adjoining the box B, there is a shoulder, *f*, between which and the end of the sleeve the car-wheel C' is received and secured on the sleeve. It will thus be seen that the wheel C', together with the sleeve D, may be turned independently of the axle A and the wheel C, while both of the wheels are supported by the axle and the axle is in no way weakened.

When both the car-wheels are of the same diameter and are run upon a straight track, the wheel C' and sleeve D will not turn on the axle; but if there is a slight difference in the diameters of the wheels C C', or if the wheels pass around a curve, the sleeve D turns upon the axle A, and thus avoids the friction which would be created if one or the other of the wheels were compelled to slide on the rail.

By extending the sleeve past the center of the axle and over the greater portion of the length thereof I am able to secure a long bearing for the sleeve, and to provide support for the central part of the axle, which will prevent accidents in case of the breaking of an axle at any point near the center thereof.

Having thus described my invention, what I claim as new, and desire to secure by Letters Patent, is—

1. The combination, with a car-axle provided with bearings at opposite ends, and carrying a car-wheel near one of its bearings, of a sleeve closely inclosing the axle between the wheel and the opposite bearing, and a wheel secured to the sleeve near the said bearing of the axle, and means, substantially as shown and described, for excluding dust from the sleeve bearing on the axle, as set forth.

2. The combination, with the axle A, carrying the wheel C and provided with the collar *a*, of the sleeve D, carrying the wheel C', and inclosing the axle between the wheels, the sleeve E, provided with the fillet *b*, and screwed on the end of the sleeve B, the gland F, and packing *c*, received in the sleeve E, substantially as described.

CHARLES E. CANDEE.

Witnesses:
C. SEDGWICK,
JNO. MATTHEW RITTER.